(12) United States Patent
Kaimai et al.

(10) Patent No.: US 6,568,195 B2
(45) Date of Patent: May 27, 2003

(54) AMMONIA REFRIGERATING APPARATUS

(75) Inventors: Takashi Kaimai, Saitama (JP); Hitoshi Takahashi, Saitama (JP); Masato Namiki, Tokyo (JP); Goro Yamamoto, Tokyo (JP)

(73) Assignees: Asahi Denka Kogyo K.K., Tokyo (JP); Japan Energy Corporation, Tokyo (JP); Maekawa Mfg. Co. Ltd., Tokyo (JP)

( * ) Notice: Subject to any disclaimer, the term of this patent is extended or adjusted under 35 U.S.C. 154(b) by 0 days.

(21) Appl. No.: 10/169,168
(22) PCT Filed: Jan. 11, 2001
(86) PCT No.: PCT/JP01/00092

§ 371 (c)(1),
(2), (4) Date: Jun. 28, 2002

(87) PCT Pub. No.: WO01/51594

PCT Pub. Date: Jul. 19, 2001

(65) Prior Publication Data

US 2003/0024255 A1 Feb. 6, 2003

(30) Foreign Application Priority Data

Jan. 12, 2000 (JP) ............................................. 2000-3810

(51) Int. Cl.[7] .................................................. F25B 41/00
(52) U.S. Cl. .......................................... 62/114; 252/68
(58) Field of Search ........................... 62/114, 115, 467, 62/498; 252/68

(56) References Cited

U.S. PATENT DOCUMENTS 4,061,684 A * 12/1977 Helfert et al. .............. 260/615
5,595,678 A * 1/1997 Short et al. .................. 252/68
5,651,257 A * 7/1997 Kasahara et al. ............. 62/84
5,688,433 A * 11/1997 Kasahara et al. ............ 252/68
5,767,324 A * 6/1998 Chaffanjon et al. ......... 568/621
6,189,322 B1 * 2/2001 Ishihara et al. .............. 62/114

* cited by examiner

Primary Examiner—Denise L. Esquivel
Assistant Examiner—Malik N. Drake
(74) Attorney, Agent, or Firm—Sughrue Mion, PLLC

(57) ABSTRACT

To provide a refrigerating unit using ammonia as a refrigerant, which uses a lubricant that is excellent in the compatibility with an ammonia refrigerant as well as in the lubricity and the stability.

An ammonia refrigerating unit formed by a refrigerating cycle including a refrigeration compressor, a condenser, an expansion valve and an evaporator, wherein a working is circulated in said refrigerating cycle, the working fluid including ammonia and a lubricant that contains a polyether compound represented by one of the following formula (1) or (2):

$$X\{\!-\!\!O\!-\!(AO)_n\!-\!H\}_p \quad (1)$$

$$X\{\!-\!\!O\!-\!(AO^1)_a\!-\!(AO^2)_b\!-\!H\}_p \quad (2)$$

[wherein X represents a residue resulting from removing a hydroxyl group from a monool or a polyol; $(AO)_n$ represents an AO chain constituted by copolymerization of EO and C3 or more AO; $(AO^1)_a$ represents an AO chain constituted by copolymerization of EO and PO and/or BO; $AO^2$ represents C3 or more AO; and in the formula (1), the number of the secondary hydroxyl groups from among hydroxyl groups at the structural terminal is 50% or more of the total number of the hydroxyl groups].

6 Claims, 1 Drawing Sheet

AMMONIA REFRIGERATING APPARATUS

TECHNICAL FIELD

The present invention relates an ammonia refrigerating unit using a working fluid comprising an ammonia refrigerant and a lubricant containing a polyether compound having a specific structure.

BACKGROUND ART

A compression refrigerator generally comprises a compressor, a condenser, an expanding mechanism (an expansion valve etc.) and an evaporator and thereof, a chlorine-containing fluorohydrocarbon (flon compound) such as trichlorofluoromethane (R11), dichlorodifluoromethane (R12) or chlorodifluoromethane (R22) has been heretofore used as the refrigerant for a longtime. These flon compounds cause an international environmental problem such as ozone depletion and therefore, the use thereof is regulated and these flon compounds have been converted to a chlorine-free flon compound such as difluoromethane (R32), tetrafluoroethane (R134 or R134a) or difluoroethane (R152 or R152a). Even in these chlorine-free flon compounds, a fear of global warming is very high and therefore, an anxiety of causing environmental problem is being pointed out from the long-term standpoint.

Accordingly, in recent years, hydrocarbon, ammonia or the like has been noticed again as a refrigerant not causing such an environmental problem. From the standpoint of the adaptability and the safety to the global environment or the human body, these refrigerants are extremely excellent as compared with a flon compound. Moreover, although these compounds were not predominant as a refrigerant until now, they also have the actual result used for many years.

So far, ammonia is not compatible with a mineral oil or an alkylbenzene (which is a refrigerator oil) used in a refrigerator and therefore, the use thereof has been heretofore limited only to a refrigerator provided with an oil circulatory system where an oil separator having high performance is provided at the outlet side of a compressor, an oil is separated and recovered so that the oil is not carried out to a refrigerating cycle and again returned to the inlet side of the compressor. When such an oil circulatory system does not have a sufficient function, a refrigerator oil is carried out to the inside of a refrigerating cycle to incur shortage of the compressor lubricating oil, with the result that, a seizure or the like is brought about due to lubrication failure at a sliding portion, and the unit life may be remarkably shortened. An evaporator is a low temperature and therefore, a high-viscosity refrigerator oil carried out to the inside of a refrigerating cycle is remained in the evaporator, with the result that the heat exchange efficiency may be lowered. Accordingly, a refrigerating unit using ammonia was limited to an industrial unit which is a relatively large-size liquid pump type unit performing a forced circulation and in which a maintenance of regularly recovering an oil accumulated at a low temperature portion can be performed.

However, to overcome the above-described environmental issues, a refrigerating unit using ammonia as the refrigerant is being reconsidered. Accompanying the tendency, a working fluid which has the compatibility with an ammonia refrigerant and can be used for a refrigerating unit without an oil circulatory system similarly to the flon refrigerant, has been proposed. For example, European Patent No. 0490810 discloses a lubricant comprising a polyalkylene glycol which is a copolymer of ethylene oxide (EO) and propylene oxide (PO) and has the EO/PO ratio of 4/1. European Patent No. 585934 discloses a lubricant comprising a monofunctional or a difunctional polyalkylene glycol having the EO/PO ratio of 2/1 to 1/2. German Patent No. 4404804 discloses a polyether compound-based lubricant represented by the general formula: RO—(EO)$_x$—(PO)$_y$—H [R is C$_1$ to C$_8$ alkyl group, and x and y each is a number of 5 to 55]. European Patent No. 699737 discloses a lubricant represented by the general formula: Z{—O(CH$_2$CH(R$^1$)O)$_n$—(CH$_2$CH(R$^1$)O)$_m$—H}$_p$ [Z represents C6 or more aryl group or C10 or more alkyl group, R1 represents a hydrogen atom, a methyl group or an ethyl group, n represents 0 or a positive number, m represents a positive number and p represents a number corresponding to the valence of Z].

JP-A-5-9483 and International Patent Publication WO94/12594 disclose a lubricant which comprises polyalkylene glycol diether and is excellent in the compatibility with ammonia and the stability in an ammonia atmosphere.

When a polyalkylene glycol-based compound as described above is used as a lubricant component of a working fluid for a refrigerating unit using an ammonia refrigerant, it is pointed out that a polyfunctional polyalkylene glycol having two hydroxyl groups has a problem in the stability and the moisture absorption. The polyalkylene glycol diether as described above has a problem in that it is low in the compatibility with ammonia as compared with polyalkylene glycol containing a hydroxyl group and is not compatible with ammonia depending on the structure. The polyalkylene glycol diether also has a problem in that the terminal of the molecule is blocked up with an alkyl group but the production process becomes complex because of performing the terminal blockade.

Accordingly, an object of the present invention is to provide a refrigerating unit using ammonia as the refrigerant, which uses a working fluid composition comprising a mixture of an ammonia refrigerant and a lubricant having excellent compatibility with ammonia as well as superior lubricity and the stability and which does not demand an oil circulatory system.

Therefore, the present invention relates to an ammonia refrigerating unit, in which a refrigeration or heat pump cycle is formed by a refrigerating cycle, characterized by comprising a refrigeration compressor, a condenser, an expansion mechanism such as an expansion valve, and an evaporator, characterized in that a working fluid is circulated in the refrigerating cycle, the working fluid including ammonia and a lubricant that contains a polyether compound mixed in a compatible state with the ammonia and represented by one of the following general formulae (1) and (2):

$$X\{-O-(AO)_n-H\}_p \quad (1)$$

[wherein X represents a residue resulting from removing a hydroxyl group from a monool or a polyol, (AO)$_n$ represents a polyoxyalkylene group constituted by copolymerization of an ethylene oxide and an alkylene oxide having 3 or more carbon atoms, n represents a number of 2 or more, p represents the valence number of X, and the number of the secondary hydroxyl groups from among hydroxyl groups located at the structural terminal is 50% or more of the total number of the hydroxyl groups]

$$X\{-O-(AO^1)_a-(AO^2)_b-H\}_p \quad (2)$$

[wherein X represents a residue resulting from removing a hydroxyl group from a monool or a polyol, (AO$^1$)$_a$ represents a polyoxyalkylene group constituted by copolymerization of an ethylene oxide and a propylene oxide and/or a butylene oxide, AO$^2$ represents an oxyalkylene group having 3 or more carbon atoms, a represents a number of 2 or more, b represents a number of 1 or more, and p represents the valence number of X].

Further, the present invention relates to an ammonia refrigerating unit, characterized in that in the refrigerating cycle, a ratio of the ammonia refrigerant and the lubricant is 99:1 to 50:50 in terms of the weight ratio.

BRIEF DESCRIPTION OF THE DRAWINGS

In FIG. 1, 11 shows a refrigerating compressor, 12 shows a condenser, 13 shows an expansion valve, 14 shows a high pressure liquid receiver, 15 shows a evaporator, 16 shows a fan and 17 shows a double riser.

BEST MODE FOR CARRYING OUT THE INVENTION

Figure 1:
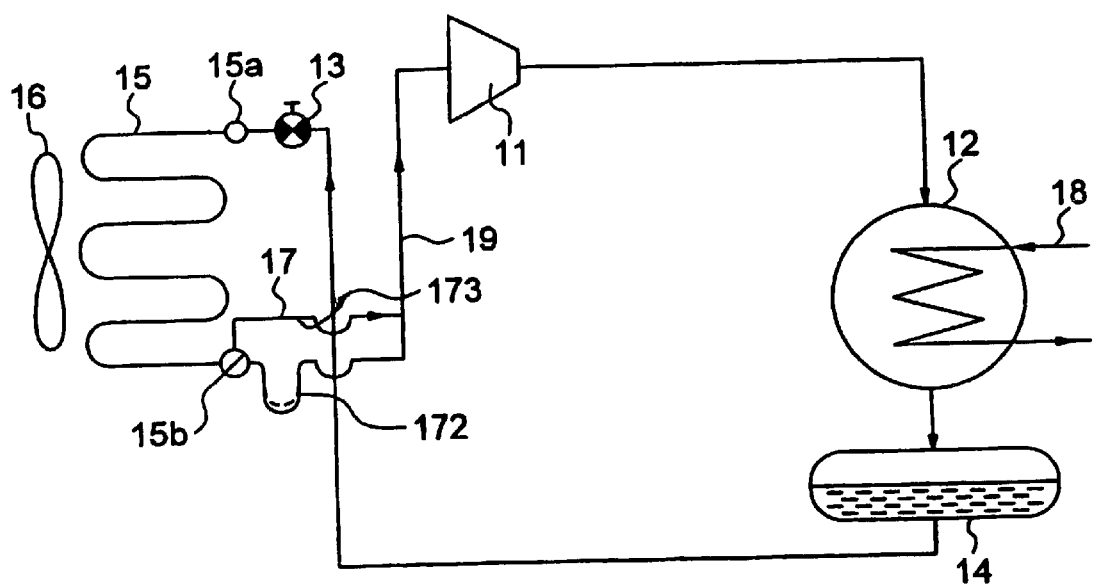
FIG. 1 shows a single-step compression type direct expansion system refrigerating unit according to Examples of the present invention.

The present invention relates to a refrigerating unit obtained by filling in an unit a working fluid comprising an ammonia refrigerant and a lubricant containing a polyether compound having a specific structure where the polyether compound can be solved in the ammonia refrigerant and moreover does not separate from the refrigerant to form a two-layer even at the evaporation temperature. The refrigerating unit comprises 1% by weight or more of the lubricant filled with respect to the ammonia refrigerant in terms of the filling ratio between the ammonia refrigerant and the lubricant to constitute a refrigeration or heat pump cycle.

The working fluid for use in the refrigerating unit of the present invention is constituted by mixing an ammonia refrigerant and a lubricant. The ammonia refrigerant and the lubricant may be previously mixed to produce a working fluid or each of them may be independently filled in a refrigeration or a heat pump cycle to constitute a working fluid composition in the cycle.

The lubricant for use in the working fluid of the present invention contains a polyether compound with a specific structure where the number of the secondary hydroxyl groups in hydroxyl groups located in the terminal of the structure is 50% or more of the whole number of the hydroxyl groups or the terminal part of the structure comprises an oxyalkylene group having 3 or more carbon atoms as described in the general formula (1) or (2), and preferably uses this polyether compound as a base oil.

Although the ratio between the ammonia refrigerant and the lubricant varies depending on the kind of a compressor, it is preferable to reduce the lubricant as much as possible in view of elevating the heat exchange efficiency, fundamentally, as long as the lubricity can be maintained. For example, in the refrigerating unit using a rotary compressor of the present invention, if the blending ratio of ammonia refrigerant and lubricant is set to about 99:1 to 50:50, preferably about 97:3 to 70:30, a sufficient lubricity and refrigeration ability can be obtained.

The polyether compound represented by the above-described general formula (1) or (2) is described in more detail.

In the general formula (1) or (2), X represents a residue resulting from removing a hydroxyl group from a monool or a polyol. Examples of the monool include: alcohols such as methanol, ethanol, propanol, 2-propanol, butanol, 2-butanol, pentanol, 2-pentanol, 3-pentanol, isopentyl alcohol, 2-methyl-4-pentanol, hexanol, secondary hexanol, isohexanol, heptanol, secondary heptanol, octanol, 2-ethylhexanol, secondary octanol, isooctanol, nonanol, secondary nonanol, 1-decanol, isodecyl alcohol, secondary decanol, undecanol, secondary undecanol, 2-methyl decanol, lauryl alcohol, secondary dodecanol, 1-tridecanol, isotridecyl alcohol, secondary tridecanol, myristyl alcohol, secondary tetradecanol, pentadecanol, secondary pentadecanol, cetyl alcohol, palmityl alcohol, secondary hexadecanol, heptadecanol, secondary heptadecanol, stearyl alcohol, isostearyl alcohol, secondary octadecyl alcohol, oleyl alcohol, behenyl alcohol, eicosanol, docosanol, tetracosanol, hexacosanol, octacosanol, myricyl alcohol, laccerol, tetratriacontanol, allyl alcohol, cyclopentanol, cyclohexanol, 2-butyloctanol, 2-butyldecanol, 2-hexyloctanol, 2-hexyldecanol, 2-hexyldodecanol, 2-octyldecanol, 2-octyldodecanol, 2-octyltetradecanol, 2-decyldodecanol, 2-decyltetradecanol, 2-decylhexadecanol, 2-dodecyltetradecanol, 2-dodecylhexadecanol, 2-dodecyloctadecanol, 2-tetradecyloctadecanol, 2-tetradecylicosanol, 2-hexadecyloctadecanol and 2-hexadecylicosanol; and phenols such as phenol, cresol, ethylphenol, tert-butylphenol, hexylphenol, octylphenol, nonylphenol, decylphenol, undecylphenol, dodecylphenol, tridecylphenol, tetradecylphenol, phenylphenol, benzylphenol, styrenated phenol and p-cumylphenol.

Examples of the polyol include: diols such as ethylene glycol, propylene glycol, 1,4-butanediol, 1,2-butanediol, neopentyl glycol, 1,6-hexandiol, 1,2-octanediol, 1,8-octanediol, isoprene glycol, 3-methyl-1,5-pentanediol, sorbite, catechol, resorcin, hydroquinone, bisphenol A, bisphenol F, hydrogenated bisphenol A, hydrogenated bisphenol F and dimerdiol; trihydric alcohol such as glycerol, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolethane and trimethylolpropane; tetrahydric alcohol such as pentaerythritol, erythritol, 1,2,3,4-pentanetetrol, 2,3,4,5-hexanetetrol, 1,2,4,5-pentanetetrol, 1,3,4,5-hexanetetrol, diglycerol and sorbitan; pentahydric alcohol such as adonitol, arabitol, xylitol and triglycerol; hexahydric alcohol such as dipentaerythritol, sorbitol, mannitol, iditol, inositol, dalsitol, talose and allose; octahydric alcohol such as saccharose; polyglycerol or the dehydrated condensate thereof. p is a valence number of X and is preferably a number of from 1 to 8.

X may be a residue of a compound derived from the above-described monool or polyol. Examples of such a compound derived from the monool or the polyol include a sodium alcoholate or a potassium alcoholate of the monool or the polyol above.

Here, if the valence number p of X is too large, the polyether compound obtained may have excessively large molecular weight and excessively high viscosity or may have reduced compatibility with an ammonia refrigerant. Therefore, the valence number p of X is more preferably from 1 to 3. In particular, it is most preferable that p is 1, more specifically, X is a residue resulting from removing a hydroxyl group from a monool. Even in the case of monool, if the number of carbon atoms becomes excessively large, the polyether compound obtained may have reduced compatibility with an ammonia refrigerant and therefore, the carbon atom number of X is preferably from 1 to 8, more preferably from 1 to 4 and X is most preferably a methyl group.

In the general formula (1), $(AO)_n$ represents a polyoxy alkylene group constituted by the copolymerization of an ethylene oxide and an alkylene oxide having 3 or more carbon atoms. Examples of the alkylene oxide having 3 or more carbon atoms include propylene oxide, butylene oxide, α-olefin oxide and styrene oxide. The polymerization ratio of an ethylene oxide and an alkylene oxide having 3 or more carbon atoms is not particularly limited. However, at least the ethylene oxide is necessary in order to impart excellent compatibility with ammonia to a polyether compound which is a polymerization product.

In formula (2), $(AO^1)_a$ represents a polyoxyalkylene group constituted by the copolymerization of an ethylene oxide and a propylene oxide and/or a butylene oxide. The polymerization ratio of an ethylene oxide and a propylene oxide and/or a butylene oxide is not particularly limited. However, at least one of the ethylene oxide is necessary in order to impart excellent compatibility with ammonia to a polyether compound which is a polymerization product.

However, if the ratio of ethylene oxide is excessively high, the moisture absorption or the low-temperature properties such as the pour point may deteriorate, or a powder form solid may separate or precipitate. Therefore, the ratio of the oxyethylene group in $(AO)_n$ or $(AO^1)_a$ is preferably 50% by weight or less, more preferably from 50 to 5% by weight, most preferably from 30 to 5% by weight. For the same reason, the ratio of the oxyethylene group in the molecule of the polyether compound for use in the present invention, which is represented by the above-described general formula (1) or (2), is preferably 40% or less, more preferably 30% or less, and most preferably 20% or less based on the molecular weight of the polyether compound.

The form of the copolymerization may be the block polymerization, the random polymerization or a mixture of the block polymerization and the random polymerization. However, if the whole part of $(AO)_n$ or $(AO^1)_a$ are a polyoxyalkylene chain constituted by the block polymerization, the fluidity at a low temperature may deteriorate. Thus, it is particularly preferable that the $(AO)_n$ or the $(AO^1)_a$ is a polyoxyalkylene chain constituted by the random polymerization or it is a polyoxyalkylene chain partially including the random polymerization. n and a each represents a number of 2 or more, preferably 2 to 150, and more preferably 5 to 100.

The $AO^2$ in the general formula (2) represents an oxyalkylene group having 3 or more carbon atoms. Examples of the oxyalkylene group having 3 or more carbon atoms include an oxypropylene group, an oxybutylene group and an oxyalkylene group having from about 5 to 24 carbon atoms. Among these, an oxypropylene group or an oxybutylene group is preferable. b represents a number of 1 or more, preferably from 1 to 10. The $(AO^2)_b$ represents a polyoxyalkylene group comprising the above-described one or more oxyalkylene groups having 3 or more carbon atoms.

The lubricant of the present invention comprises a polyether compound which is represented by the general formula (1) satisfying the above-described conditions and in which the structural terminal on the opposite side of X is a hydroxyl group. In the polyether compound represented by the general formula (1) for use in the present invention, the number of the secondary hydroxyl groups, of all the hydroxyl groups located at the structural terminal, must be 50% or more of the total number of the hydroxyl groups. Further, it is more preferably 70% or more, and most preferably 80% or more. The reason is that if the secondary hydroxyl groups comprise 50% or more of all the hydroxyl groups located at the structural terminal, the polyether compound exhibits excellent stability with respect to an ammonia refrigerant, whereas if the secondary hydroxyl groups comprise less than 50% of the hydroxyl groups located at the structural terminal, the polyether compound exhibits inferior stability with respect to an ammonia refrigerant. The secondary hydroxyl group as used herein is a hydroxyl group bonding to the secondary carbon atom and the ratio of this secondary hydroxyl group can be measured by $^1$H-NMR.

In the polyether compound represented by the general formula (1) for use in the present invention, 50% or more of all the hydroxyl groups located at the structural terminal are the secondary hydroxyl groups, and therefore the polyether compound exhibits excellent solubility and stability with respect to an ammonia refrigerant. The polyether compound represented by the general formula (2) for use in the present invention has a group represented by $(AO^2)_b$—H at the structural terminal and therefore exhibits excellent solubility and stability with respect to an ammonia refrigerant.

In general, a hydroxyl group bonding to the primary carbon atom changes into a carboxylic acid through an aldehyde if it is oxidized. However, there is a fear that a carboxylic acid produces an acid amide in the presence of ammonia and, as a result, the acid amide is precipitated. In comparison therewith, the hydroxyl group bonding to the secondary carbon atom only changes into a ketone even if it is oxidized and the ketone is stable in the presence of ammonia as compared with a carboxylic acid. Accordingly, it is presumed that the polyether compound used in the present invention can exhibit an excellent stability even in the presence of ammonia because: in the case of the polyether compound represented by the general formula (1), 50% or more of all the hydroxyl groups at the structural terminal bond to the secondary carbon atoms; and in the case of the polyether compound represented by the general formula (2), it is a polyether compound obtained by finally adding an alkylene oxide having 3 or more carbon atoms and in which the hydroxyl group at the structural terminal bonds to the secondary carbon atom. That is, the lubricant used in the present invention solves a problem peculiar to a lubricant for a refrigerator using an ammonia refrigerant by selecting a lubricant having a specific structure as described above.

In the lubricant used for a refrigerator using an ammonia refrigerant of the present invention, any of the polyether compounds represented by the above-described general formula (1) and (2) can be used. However, it is more preferable to use the polyether compound where the secondary hydroxyl groups from among the hydroxyl groups located at the structural terminal comprise 50% or more of all the hydroxyl groups and which has a structure represented by the above-described general formula (2).

The molecular weight of the polyether compound represented by the general formula (1) or (2) for use in the present invention is not particularly limited. However, since the molecular weight has a tendency to be proportionate to the kinematic viscosity and therefore, the molecular weight is preferably on the order of from 300 to 3,000 in order to keep the kinematic viscosity within the preferable range as described below.

The kinematic viscosity of the polyether compound represented by the general formula (1) or (2) for use in the present invention is not particularly limited. However, if the kinematic viscosity is too low, the sealability is poor and the lubricity may also decrease, whereas if the kinematic viscosity is too high, the compatibility with ammonia is lowered and the energy efficiency also deteriorates. Accordingly, the kinematic viscosity at 40° C. is preferably from 15 to 200 cSt, more preferably from 20 to 150 cSt.

Since the polyether compound represented by the general formula (1) or (2) for use in the present invention is a lubricant used in a refrigerator using an ammonia refrigerant, it is preferable that impurities such as moisture or chlorine are present in an amount as small as possible. Since the moisture accelerates the deterioration of the lubricant or additive, it is preferred that its content be as small as possible, preferably 500 ppm or less, more preferably 300 ppm or less and most preferably 100 ppm or less. Since a polyether compound generally has a moisture absorption property, the storage or the filling thereof in a refrigerator requires much care. However, the water can be removed by the distillation under decompressing or using a drier filled with a desiccant.

In the presence of ammonia, chlorine forms an ammonium salt to cause the blocking of capillary and therefore, the chlorine content is preferably as small as possible, preferably 100 ppm or less, and more preferably 50 ppm or less.

Further, during the production of the polyether compound containing an oxypropylene group, propylene oxide may cause a side reaction to produce an allyl group having a carbon—carbon double bond. If an allyl group is produced, at first, the thermal stability of the lubricant itself decreases. Moreover, a polymerization product is produced to cause sludge and a peroxide is produced because the allyl group is easily oxidized. If a peroxide is produced and decomposed to produce a carbonyl group, the carbonyl group reacts with an ammonia refrigerant to produce an acid amide, so that the acid amide also causes blocking of capillary. Accordingly, the degree of unsaturation due to an allyl group or the like is preferably as low as possible. Specifically, this unsaturation degree is preferably 0.05 meq/g or less, more preferably 0.03 meq/g or less and most preferably 0.02 meq/g or less.

The peroxide value is preferably 10.0 meq/kg or less, more preferably 5.0 meq/kg or less and most preferably 1.0 meq/kg or less. The carbonyl value is preferably 100 ppm by weight or less, more preferably 50 ppm by weight or less and most preferably 20 ppm by weight or less.

In order to produce such a polyether compound having a low unsaturation degree represented by the general formula (1) or (2), a reaction temperature in the case of reacting a propylene oxide is preferably 120° C. or lower, more preferably 110° C. or lower. During the production of a polyether compound, if an alkali catalyst is used and, in order to remove this, an inorganic-base adsorbent such as activated carbon, activated clay, bentonite, dolomite or aluminosilicate is used, the unsaturation degree can be reduced. When producing or using the lubricant of the present invention, minimizing the contact of the lubricant with oxygen or using an antioxidant at the same time may also prevent the increase in the peroxide value or the carbonyl value.

The unsaturation degree, the peroxide value and the carbonyl value as described herein are the values measured by the following method according to Standard Methods for the Analysis of Oils established by Japan Oil Chemists' Soceity. The outline of the measurement methods is described below.

<Measurement Method of Unsaturation Degree (meq/g)>

A sample is reacted with Wijs' solution (IC1-acetic acid solution), left in a dark place and then, the excess IC1 is reduced to iodine, the iodine content is titrated by sodium thiosulfate to calculate the iodine number, and this iodine number converted into a vinyl equivalent amount and the value thus obtained is defined as the unsaturation degree.

<Measurement Method of Peroxide Value (meq/g)>

Potassium iodide is added to a sample, a free iodine produced is titrated with sodium thiosulfate, and this free iodide is converted into a milliequivalent number based on 1 kg of the sample and the value obtained is defined as a peroxide value.

<Measurement Method of Carbonyl Value (ppm by Weight)>

2,4-dinitrophenylhydrazine is acted on a sample to produce chromophoric alkynoid ions, and the absorbance of this sample at a wavelength of 480 nm is measured. Then, the absorbance thus obtained is converted into the carbonyl amount based on the calibration curve previously obtained by using cinnamaldehyde as a standard reference material.

A production method of the polyether compound represented by the general formula (1) for use in the present invention is not particularly limited and a usual production method of a polyether compound may be used. For example, the polyether may be produced by a method where a mixed alkylene oxide of an ethylene oxide and an alkylene oxide having 3 or more carbon atoms (e.g. propylene oxide) is reacted with an alcohol such as methanol as a starting material at a temperature of 100 to 150° C. and under a pressure of about 0 to 10 kg/cm², in the presence of an alkali catalyst such as sodium hydroxide or potassium hydroxide. The polyether compound represented by the general formula (2) may be produced, for example, by a method where a mixed alkylene oxide of an ethylene oxide and a propylene oxide (or butylene oxide) is reacted with an alcohol such as methanol as a starting material under the same conditions as described above and then an alkylene oxide having 3 or more carbon atoms such as propylene oxide is reacted therewith.

The production method of the polyether compound represented by the general formula (2) is not particularly limited and the polyether compound may be produced by a method where a mixed alkylene oxide of an ethylene oxide and a propylene oxide (or butylene oxide) is reacted with an alcohol such as methanol as a starting material under the same conditions as described above and then an alkylene oxide having 3 or more carbon atoms such as propylene oxide is reacted therewith.

To the lubricant for use in the present invention, if desired, other components can be added. For example, a commonly known other refrigerator lubricant such as mineral oil, alkylbenzene, polyalkylene glycol diether, polyalkylene glycol and polyol ester or an additive such as an extreme pressure agent such as tricresyl phosphate and triphenyl phosphate;

an antioxidant such as 2,6-ditertiary butyl-4-methylphenol, 4,4,'-methylene bis-2,6-ditertiary butylphenol, dioctyldiphenylamine and dioctyl-p-phenylenediamine; a stabilizer such as phenyl-glycidyl ether; an oiliness agent such as glycerol monooleyl ether and glycerol monolauryl ether; a metal inactivator such as benzotriazole; or a foam suppressor such as polydimethyl siloxane, can be appropriately blended. In addition thereto, an additive such as detergent-dispersant, viscosity index improver, rust preventives, corrosion inhibitor or pour point depressant can be blended, if desired. These additives are generally blended in an amount of about 0.01 to 10% by weight based on the lubricant of the present invention.

EXAMPLES

The present invention is described in more detail below by referring to Examples. In the following Examples, part and % are indicated in terms of a weight as long as there is no particular description. EO is an abbreviation of oxyethylene group, PO is an abbreviation of oxypropylene group, BO is an abbreviation of oxybutylene group. In the marks made between PO and EO, the mark "–" expresses a block copolymerization and the mark "/" expresses a random copolymerization.

1. Production of Lubricant:

64 g of methanol and 8 g of potassium hydroxide as a catalyst were charged In a 3L-volume autoclave. After dissolving the catalyst, a mixed alkylene oxide of 1,548 g propylene oxide and 388 g ethylene oxide (weight ratio: 8/2) was reacted with the methanol at a reaction temperature of 100 to 150° C. and under a pressure of 0 to 10 kg/cm². After aging the reactant, 200 g of propylene oxide was reacted thereto at a reaction temperature of 100 to 150° C. and under a pressure of 0 to 10 kg/cm² to obtain a lubricant comprising the polyether compound having a structure shown in Example 1 of Table 1. In this polyether compound, 95 mol % of the hydroxyl groups in the terminal was the secondary hydroxyl groups, the average molecular weight was 1,000 and the kinematic viscosity at 40° C. was 45.3 cSt. Other polyether compounds in Examples 2 to 14 and Comparative Examples 1 to 4 were produced in the same manner as in Example 1. The structure and the various characteristic values of the lubricant comprising each polyether compound are shown in Table 1.

In all samples used in each Example and Comparative Example, the unsaturation degree, the peroxide value and the carbonyl value were measured by the above-described method, with the result that the unsaturation degree was from 0.009 to 0.018 meq/g, the peroxide value was from 2.5 meq/kg to 3.2 meq/kg and the carbonyl value was from 10 ppm by weight to 15 ppm by weight. The water content thereof was measured using Karl Fischer moisture meter, with the result that all of them were 300 ppm or less.

For evaluating the stability in an ammonia atmosphere of each sample as a working fluid composition to be used in an ammonia refrigerating unit, the following test was performed. More specifically, in a 300 mL bomb fed with an iron wire having a diameter of 1.6 mmφ as a catalyst, 50 g of each sample was packed. The bomb was pressurized up to 0.6 kg/cm²G using ammonia, moreover pressurized up to

TABLE 1

| | Structure of polyether compound | Ratio of secondary hydroxyl group (mol %) | Average molecular weight | PO/EO ratio | Kinematic viscosity at 40° C. (cSt) |
|---|---|---|---|---|---|
| Example 1 | CH₃O—{(PO)/(EO)}-(PO)₂—H | 95 | 1,000 | 80/20 | 45.3 |
| Example 2 | CH₃O—{(PO)/(EO)}-(PO)₂—H | 95 | 1,000 | 70/30 | 47.5 |
| Example 3 | CH₃O—{(PO)/(EO)}-(PO)₂—H | 95 | 2,000 | 80/20 | 105.3 |
| Example 4 | CH₃O—{(PO)/(EO)}-(BO)₂—H | 95 | 1,000 | 80/20 | 44.3 |
| Example 5 | CH₃O—{(PO)/(EO)}—H | 90 | 950 | 85/15 | 46.7 |
| Example 6 | CH₃O—{(PO)/(EO)}—H | 75 | 900 | 70/30 | 48.3 |
| Example 7 | CH₃O—{(PO)/(EO)}—H | 80 | 1,200 | 70/30 | 55.4 |
| Example 8 | CH₃O—(EO)₂-{(PO)/(EO)}—H | 90 | 950 | 85/15 | 47.7 |
| Example 9 | CH₃O—(PO)₂—{(PO)/(EO)}—H | 90 | 970 | 85/15 | 48.8 |
| Example 10 | C₄H₉O—{(PO)/(EO)}-(PO)₂—H | 95 | 1,000 | 80/20 | 45.0 |
| Example 11 | C₄H₉O—{(PO)/(EO)}—H | 90 | 940 | 85/15 | 44.6 |
| Example 12 | CH₃O—{(PO)/(EO)}-(PO)₂—H | 95 | 1,100 | 20/10 | 47.0 |
| Example 13 | HO—(PO)-(EO)-(PO)—H | 95 | 700 | 80/20 | 53.0 |
| Example 14 | G[—O—{(PO)/(EO)}—H]₃ | 90 | 600 | 85/15 | 80.5 |
| Comparative Example 1 | CH₃O—(PO)—H | 95 | 900 | 100/0 | 47.1 |
| Comparative Example 2 | CH₃O—(PO)-(EO)—H | 0 | 1,000 | 70/30 | 46.1 |
| Comparative Example 3 | C₁₂H₂₅O—(PO)—H | 95 | 1,000 | 100/0 | 83.0 |
| Comparative Example 4 | CH₃O—{(PO)/(EO)}-H | 40 | 1,000 | 35/65 | 51.1 |

Note that, in a section of the polyether compound structure in Table 1, {(PO)/(EO)} expresses a random copolymer of propylene oxide and ethylene oxide, and (PO)–(EO) expresses a block copolymer of propylene oxide and ethylene oxide.

Similarly, G expresses a residue resulting from removing a hydroxyl group from glycerol.

The values in a section of "PO/EO ratio" expresses the weight ratio of {(PO)/(EO)} part in the polyether compound, except that the values express the weight ratio of PO/EO in the whole polyether compound in Example 13 and Comparative Example 2.

2. Evaluation Test:

Each lubricant shown in each Example and Comparative Example of Table 1 was next subjected to the following tests and evaluated as a lubricant for ammonia refrigerating unit.

<Compatibility with Ammonia>

5 mL of each sample and 1 mL of ammonia were charged in a glass tube and then cooled from a room temperature at a rate of 1° C. per minute, whereby a temperature causing the two-layer separation was measured.

<Falex Seizure Load>

For evaluating the lubricity of each sample, Falex seizure load was measured in accordance with ASTM-D-3233-73.

<Bomb Test>

5.7 kg/cm²G using a nitrogen gas. Thereafter, the bomb was heated to 150° C., kept for 7 days at the same temperature and then, left cooling to the room temperature. After removing a gas to lower a pressure, the bomb was further decompressed to remove ammonia from the sample. Each sample thus obtained was measured on the whole acid number and the color-phase (JIS-K-2580 ASTM color test method) before and after the test.

Further, the sample after the test was moved to a 100 mL beaker and left standing at a room temperature for 5 hours. Thereafter, the change of the appearance was observed with an eye and the evaluation was performed according to the following scores.

0: no abnormality (the same as the state before the test).
1: a powder-form precipitate is slightly observed at the bottom of the beaker.
2: the state between the score 1 and the score 3.
3: a powder-form precipitate is observed on the whole surface of the bottom of the beaker.
4: The sample was caked or lost the fluidity at the room temperature.

The results of the evaluation test above are shown in Table 2.

TABLE 2

| | Temperature of two-layer separation (° C.) | seizure load (Lbf) | Bomb test (before/after) | | |
|---|---|---|---|---|---|
| | | | Color-phase (ASTM) | Acid number (mgKOH/g) | Appearance after test |
| Example 1 | −48 | 870 | L0.5/L0.5 | 0.01/0.01 | 0 |
| Example 2 | −49 | 900 | L0.5/L0.5 | 0.01/0.01 | 0 |

TABLE 2-continued

|  | Temperature of two-layer separation (° C.) | seizure load (Lbf) | Bomb test (before/after) | | |
|---|---|---|---|---|---|
|  |  |  | Color-phase (ASTM) | Acid number (mgKOH/g) | Appearance after test |
| Example 3 | −33 | 920 | L0.5/L0.5 | 0.01/0.01 | 0 |
| Example 4 | −48 | 860 | L0.5/L0.5 | 0.01/0.01 | 0 |
| Example 5 | −48 | 850 | L0.5/L0.5 | 0.01/0.01 | 0 |
| Example 6 | −50 or less | 850 | L0.5/L0.5 | 0.01/0.02 | 1 |
| Example 7 | −45 | 920 | L0.5/L0.5 | 0.01/0.01 | 1 |
| Example 8 | −49 | 840 | L0.5/L0.5 | 0.01/0.01 | 0 |
| Example 9 | −49 | 840 | L0.5/L0.5 | 0.01/0.01 | 0 |
| Example 10 | −37 | 870 | L0.5/L0.5 | 0.01/0.01 | 0 |
| Example 11 | −43 | 860 | L0.5/L1.0 | 0.01/0.01 | 0 |
| Example 12 | −50 or less | 900 | L0.5/L0.5 | 0.01/0.04 | 1 |
| Example 13 | −50 or less | 820 | L0.5/L0.5 | 0.01/0.01 | 1 |
| Example 14 | −50 or less | 760 | L0.5/L0.5 | 0.01/0.02 | 1 |
| Comparative example 1 | −28 | 750 | L0.5/L1.0 | 0.01/0.01 | 1 |
| Comparative example 2 | −46 | 930 | L0.5/white | 0.01/- | 4 |
| Comparative example 3 | Insoluble at room temperature | 790 | L0.5/white | 0.01/- | 4 |
| Comparative example 4 | −50 or less | 910 | L0.5/L4.0 | 0.01/0.05 | 3 |

As it is apparent from these results, it is found that the polyether compound for use in the refrigerating unit of the present invention has sufficient lubricity and at the same time, expresses preferable compatibility with ammonia because the two-phase separation temperature from ammonia is sufficiently low, and has excellent stability in an ammonia refrigerant system because a change is scarcely observed on the color-phase, the acid number and the appearance as compared with the state before the test.

3. Test by Refrigerating Unit

Next, a test by a refrigerating unit using a working fluid composition comprising a mixture of such a lubricant and an ammonia refrigerant is described below.

FIG. 1 shows one example of the single-step compression type direct expansion system refrigerating unit according to the Example of the present invention, in which R-717 (ammonia refrigerant) as a refrigerant and the polyether compound in the above-described Example as a lubricant are filled at a ratio of 90 parts by weight: 10 parts by weight in a refrigerating cycle. In FIG. 1, 11 is a refrigerant compressor. A refrigerant working fluid comprising an ammonia refrigerant compressed by the compressor 11 and a lubricant being compatible therewith is directly introduced into the condenser 12 without passing through an oil separator, and heat-exchanged (acquisition heat: about 30° C.) with a cooling water (coolant tube 18) inside the condenser 12, thereby being condensation-liquefied.

The condensed working fluid is next accumulated in the high pressure liquid receiver 14, then, vaporized under decompressing by the expanding valve 13, introduced from the introduction inlet 15a provided at the upper end of the evaporator 15 into the evaporator 15 by top feed, heat-exchanged (acquisition heat: about −15 to −20° C.) with a blast load fed from the fan 16 and then, sucked to the intake side of the compressor 11 through the double riser 17, whereby the above-described refrigerating cycle preferably is repeated.

In the above-described ammonia refrigerating unit, even if any lubricant in Examples 1 to 14 was used, the refrigerating cycle preferably worked and an excellent refrigerating performance was brought about.

INDUSTRIAL APPLICABILITY

The present invention is useful as a refrigerating unit using ammonia as the refrigerant, which uses a working fluid including an ammonia refrigerant and a lubricant that is excellent in the compatibility with ammonia as well as in the lubricity and the stability.

What is claimed is:

1. An ammonia refrigerating unit, in which a refrigeration or heat pump cycle is formed by a refrigerating cycle including a refrigeration compressor, a condenser, an expansion mechanism and an evaporator, characterized in that a working fluid is circulated in said refrigerating cycle, the working fluid including ammonia and a lubricant that contains a polyether compound mixed in a compatible state with said ammonia and represented by one of the following general formulae (1) and (2):

$$X\{-O-(AO)_n-H\}_p \qquad (1)$$

[wherein X represents a residue resulting from removing a hydroxyl group from a monool or a polyol, $(AO)_n$ represents a polyoxyalkylene group constituted by copolymerization of an ethylene oxide and an alkylene oxide having 3 or more carbon atoms, n represents a number of 2 or more, p represents the valence number of X and the number of the secondary hydroxyl groups from among hydroxyl groups located at the structural terminal is 50% or more of the total number of the hydroxyl groups]

$$X\{-O-(AO^1)_a-(AO^2)_b-H\}_p \qquad (2)$$

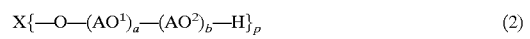

[wherein X represents a residue resulting from removing a hydroxyl group from a monool or a polyol, $(AO^1)_a$ represents a polyoxyalkylene group constituted by copolymerization of an ethylene oxide and at least one of propylene oxide, and a butylene oxide, $AO^2$ represents an oxyalkylene group having 3 or more carbon atoms, a represents a number of 2 or more, b represents a number of 1 or more, and p represents the valence number of X].

2. An ammonia refrigerating unit according to claim 1, wherein the $(AO)_n$ in the general formula (1) or the $(AO^1)_a$ in the general formula (2) is a polyoxyalkylene group constituted by random copolymerization of an ethylene oxide and a propylene oxide and/or a butylenes oxide, or is a polyoxyalkylene group partially containing random copolymerization.

3. An ammonia refrigerating unit according to claim 1, wherein the kinematic viscosity at 40° C. of the polyether compound represented by the general formula (1) or (2) is from 15 to 200 cSt.

4. An ammonia refrigerating unit according to claim 1, wherein a ratio of the oxyethylene group occupying in the $(AO)_n$ in the general formula (1) or in the $(AO^1)_a$ in the general formula (2) is from 50 to 5% by weight.

5. An ammonia refrigerating unit according to claim 1, wherein an unsaturation degree of the polyether compound represented by the general formula (1) or (2) is 0.05 meq/g or less.

6. An ammonia refrigerating unit according to claim 1, characterized in that a ratio of the ammonia refrigerant and said lubricant is 99:1 to 50:50 by weight in said refrigerating cycle.

* * * * *